(12) United States Patent
Liang et al.

(10) Patent No.: US 12,224,434 B2
(45) Date of Patent: Feb. 11, 2025

(54) SILICON-OXYGEN COMPOUND, PREPARATION METHOD THEREOF, AND RELATED BATTERY MODULE, BATTERY PACK AND DEVICE

(71) Applicant: CONTEMPORARY AMPEREX TECHNOLOGY (HONG KONG) LIMITED, Hong Kong (CN)

(72) Inventors: Chengdu Liang, Ningde (CN); Yingjie Guan, Ningde (CN); Yuzhen Zhao, Ningde (CN); Yan Wen, Ningde (CN); Qisen Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 112 days.

(21) Appl. No.: 17/140,088

(22) Filed: Jan. 3, 2021

(65) Prior Publication Data
US 2021/0175499 A1  Jun. 10, 2021

Related U.S. Application Data

(63) Continuation of application No. PCT/CN2020/102044, filed on Jul. 15, 2020.

(30) Foreign Application Priority Data

Jul. 29, 2019 (CN) .......................... 201910688461.5

(51) Int. Cl.
*H01M 4/48* (2010.01)
*H01M 4/04* (2006.01)
(Continued)

(52) U.S. Cl.
CPC .......... *H01M 4/48* (2013.01); *H01M 4/0428* (2013.01); *H01M 4/364* (2013.01); *H01M 4/38* (2013.01);
(Continued)

(58) Field of Classification Search
None
See application file for complete search history.

(56) References Cited

FOREIGN PATENT DOCUMENTS

| CN | 2004349057 A | 12/2004 |
|---|---|---|
| CN | 102365774 A | 2/2012 |

(Continued)

OTHER PUBLICATIONS

International Search Report for PCT/CN2020/10244, Oct. 16, 2020, 10 pages.
(Continued)

*Primary Examiner* — Zhongqing Wei
(74) *Attorney, Agent, or Firm* — Kilpatrick Townsend & Stockton LLP (57) ABSTRACT

The present application provide a silicon-oxygen compound, a preparation method thereof and related secondary battery, battery module, battery pack, and device. The silicon-oxygen compound provided by the present application has a formula of $SiO_x$, in which x satisfies $0<x<2$. The silicon-oxygen compound contains both sulfur and manganese element, and the sulfur element is present in an amount of 20 ppm~300 ppm. The mass ratio of sulfur element to manganese element is from 1.5 to 10.

17 Claims, 3 Drawing Sheets

(51) Int. Cl.
  *H01M 4/36*  (2006.01)
  *H01M 4/38*  (2006.01)
  *H01M 10/0525*  (2010.01)
  *H01M 4/02*  (2006.01)

(52) U.S. Cl.
  CPC .. *H01M 10/0525* (2013.01); *H01M 2004/021* (2013.01)

(56) References Cited

FOREIGN PATENT DOCUMENTS

| CN | 2013008696 A | | 1/2013 |
|---|---|---|---|
| CN | 2015170542 A | | 9/2015 |
| CN | 107636868 A | | 1/2018 |
| CN | 109599551 A | | 4/2019 |
| JP | 2004349057 A | | 12/2004 |
| JP | 2011192453 A | | 9/2011 |
| JP | 2013008696 A | * | 1/2013 |
| JP | 2015170542 A | | 9/2015 |
| JP | 2016225199 A | | 12/2016 |
| JP | 2018037414 A | | 3/2018 |
| WO | 2009141850 A1 | | 11/2009 |

OTHER PUBLICATIONS

The First Office Action for IN Application No. 202227003079, dated Apr. 26, 2022, 5 pages.
The First Office Action for China Application No. 201910688461.5, dated Jun. 28, 2021, 6 pages.
The extended European search report for EP Application No. 20827976.0, dated Jul. 27, 2021, 8 pages.
Microwave Assisted Acid Digestion of Siliceous and Organically Based Matrices. EPA 3052-1996, Revision 0, Dec. 1996, 20 pages.
Inductively Coupled Plasma Optical Emission Spectrometry.EPA 6010D-2014, Revision 5, Jul. 2018, 35 pages.
Particle size analysis—Laser diffraction methods. GB/T 19077-2016, 47 pages.
Determination of the specific surface area of solids by gas adsorption using the BET method, GB/T 19587-2017, 29 pages.
Graphite negative electrode materials for lithium ion battery, GB/T 24533-2019, 51 pages.
General rules for X-ray diffractometric analysis.JIS K0131-1996, 30 pages.
The First Office Action for Japanese Application No. 2022-505256, dated Feb. 28, 2023, 7pages.
Written Decision on Registration received in the corresponding Korean Application 10-2022-7003595, mailed Jan. 22, 2024.

* cited by examiner

SILICON-OXYGEN COMPOUND, PREPARATION METHOD THEREOF, AND RELATED BATTERY MODULE, BATTERY PACK AND DEVICE

CROSS-REFERENCE TO RELATED APPLICATION

The present invention is a continuation of International Application No. PCT/CN2020/102044, filed on Jul. 15, 2020, which claims priority to Chinese Patent Invention No. 201910688461.5, filed on Jul. 29, 2019, titled with "Silicon-Oxygen Compound and Secondary Battery", both of which are hereby incorporated by reference in their entireties.

TECHNICAL FIELD

This application belongs to the technical field of energy storage devices, and specifically relates to a silicon-oxygen compound, a preparation method thereof and related battery module, battery pack and device.

BACKGROUND

With the increasing attention to environmental protection, environmentally friendly secondary batteries are gradually being applied to electric vehicles. Different from secondary batteries used in consumer electronics, power secondary batteries have higher requirements for energy density and cycle life. Compared with traditional carbon materials, silicon-based materials have a high theoretical gram capacity as negative active materials, which is several times greater than that of graphite-based negative active materials. Therefore, the industry expects to use silicon-based materials to increase the energy density of secondary batteries.

However, the silicon-based material swells greatly during the cycle, resulting in poor cycle performance of the secondary battery. Based on this, there is a need to provide a silicon-based material with a high cycle life.

SUMMARY

A first aspect of the present application provides a silicon-oxygen compound, wherein the silicon-oxygen compound has a formula of $SiO_x$, in which $0<x<2$, and wherein the silicon-oxygen compound includes both sulfur element and manganese element, and the content of the sulfur element is 20 ppm~600 ppm; and wherein the mass ratio of the sulfur element to the manganese element is from 1.5 to 10.0.

It is surprisingly found that the silicon-oxygen compound provided the present application which includes both sulfur element and manganese element, wherein the content of the sulfur element is 20 ppm~600 ppm; and wherein the mass ratio of the sulfur element to the manganese element is from 1.5 to 10.0, significantly improves the capacity and cycle life of the silicon-oxygen compound, so that the initial coulombic efficiency and cycle performance of the secondary battery using the silicon-oxygen compound are increased.

In any of the foregoing embodiments, the content of the sulfur element may be from 50 ppm to 200 ppm. The content of the sulfur element in the silicon-oxygen compound within the given range can further improve the initial coulombic efficiency and cycle life of the silicon-oxygen compound, while ensuring its higher gram capacity, thus enabling that the initial coulombic efficiency, cycle performance and energy density have been further improved.

In any of the foregoing embodiments, the content of the manganese element may be from 5 ppm to 30 ppm, such as from 10 ppm to 90 ppm. The content of the manganese element in the silicon-oxygen compound within the given range not only ensures that the silicon-oxygen compound has a high gram capacity, but also enables the silicon-oxygen compound to have a longer cycle life, thereby further improving the energy density and cycle performance of the secondary battery.

In any of the foregoing embodiments, the mass ratio of the sulfur element to the manganese element may be 2.0 to 7.0. The mass ratio of the sulfur element to the manganese element within the above range can further improve the capacity and cycle life of the silicon-oxygen compound, thereby further improving the capacity performance and cycle performance of the secondary battery.

In any of the foregoing embodiments, the mass ratio of the sulfur element to the manganese element within the above range can further improve the capacity development and cycle life of the silicon-oxygen compound, thereby further improving the capacity performance and cycle performance of the secondary battery.

In any of the foregoing embodiments, optionally, in the X-ray diffraction pattern of the silicon-oxygen compound, there is a first diffraction peak at a position where the diffraction angle 2θ is 26°-30°, and the full width at half maxima of this diffraction peak is 0.8°-3.2°; there is a second diffraction peak at a position where the diffraction angle 2θ is 46°-50°, and the full width at half maxima of this diffraction peak is 1.0°-4.2°; and there is a third diffraction peak at a position where the diffraction angle 2θ is 54°-58°, and the full width at half maxima of this diffraction peak is 0.8°-4.5°. The silicon-oxygen compound material has the above three diffraction peaks and the full width at half maxima within the given range, which enables the silicon-oxygen compound material to have higher capacity performance and initial coulombic efficiency, and to have higher structural stability, thereby it can further improve the energy density, initial coulombic efficiency and cycle performance of the secondary battery.

In any of the above embodiments, the silicon-oxygen compound may have a powder volume resistivity under a pressure of 20 MPa of 10 Ω·cm or less, such as 1 Ω·cm or less. The powder volume resistivity of the silicon-oxygen compound within the above range can further improve the cycle life of the secondary battery.

In any of the foregoing embodiments, the silicon-oxygen compound may have an average particle size Dv50 of 2 μm-15 μm, such as an average particle size Dv50 of 3 μm-12 μm. The average particle size Dv50 of the silicon-oxygen compound within the given range enables the secondary battery to have both higher cycle performance and dynamic performance, and is also beneficial to increasing the energy density of the battery.

In any of the foregoing embodiments, the silicon-oxygen compound may have a specific surface area of 1 $m^2/g$~7 $m^2/g$, such as a specific surface area of 2 $m^2/g$~6 $m^2/g$. The specific surface area of the silicon oxygen compound within an appropriate range can further improve the cycle performance and dynamic performance of the secondary battery.

In any of the foregoing embodiments, the silicon-oxygen compound may have a compacted density of 1.2 $g/cm^3$~1.7 $g/cm^3$ measured under a pressure of 5 tons (equivalent to 49 KN), such as a compacted density of 1.3 $g/cm^3$~1.6 $g/cm^3$. The compacted density of the silicon-oxygen compound within the given range enables the secondary battery to obtain a higher energy density.

In any of the foregoing embodiments, the silicon-oxygen compound may have a coating layer on an outer surface, and the coating layer may include one or more of a polymer, a carbon material, a metal material, and a metal compound. The silicon-oxygen compound has the coating layer on the surface, which can further improve the cycle performance of the secondary battery.

A second aspect of the present application provides a method for preparing a silicon-oxygen compound, which includes the following steps:

providing raw materials including one or more of silicon oxide powder and metallic silicon powder, silicon dioxide powder, sulfur source, and optionally manganese source, and heating the raw materials in an inert atmosphere under normal pressure or reduced pressure to generate gas;

cooling the gas in an inert atmosphere under normal pressure or reduced pressure to deposit the gas to obtain a silicon-oxygen compound;

wherein the silicon-oxygen compound has a formula of $SiO_x$, in which $0<x<2$, and wherein the silicon-oxygen compound includes both sulfur element and manganese element, and the content of the sulfur element is 20 ppm~600 ppm; and wherein the mass ratio of the sulfur element to the manganese element is from 1.5 to 10.0.

The silicon-oxygen compound obtained by the method of the present application includes both sulfur element and manganese element, wherein the content of the sulfur element is 20 ppm~600 ppm; and wherein the mass ratio of the sulfur element to the manganese element is from 1.5 to 10.0. Such silicon-oxygen compound significantly improves the capacity and cycle life of the silicon-oxygen compound, so that the initial coulombic efficiency and cycle performance of the secondary battery using the silicon-oxygen compound are increased greatly.

In any of the foregoing embodiments, the deposition temperature may be 800° C. 1000° C. Adopting a suitable deposition temperature can enable the obtained silicon-oxygen compound to obtain a suitable crystal structure, thereby enabling the silicon-oxygen compound to have a higher initial coulombic efficiency and cycle performance, thereby improving the initial coulombic efficiency and cycle performance of the battery.

In any of the foregoing embodiments, after the gas deposition, a step of crushing the obtained deposit is further included. Through the crushing treatment, the silicon oxide can obtain the desired particle size distribution and specific surface area, thereby improving the corresponding performance of the battery.

In any of the foregoing embodiments, after the obtained deposit is crushed, the step of surface coating the particulate matter is further included. By forming a coating layer on the outer surface of the obtained silicon-oxygen compound through the coating step, the cycle performance of the secondary battery can be further improved.

A third aspect of the present application provides a secondary battery including the silicon-oxygen compound according to the first aspect of the present application or the silicon-oxygen compound obtained by the preparation method according to the second aspect of the present application.

Since the secondary battery of the present application uses the silicon-oxygen compound of the present application, it can have higher initial coulombic efficiency and cycle performance.

A fourth aspect of the present application provides a battery module including the secondary battery according to the third aspect of the present application.

A fifth aspect of the present application provides a battery pack including the battery module according to the fourth aspect of the present application.

A sixth aspect of the present application provides a device including at least one of the secondary battery according to the third aspect of the present application, battery module according to the fourth aspect of the present application, or battery pack according to the fifth aspect of the present application.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

DETAILED DESCRIPTION

In order to make the object, technical solution, and technical effects of the present application apparent, the following further describes the present application in detail with reference to the embodiments. It should be understood that the embodiments described in the present description are only for explaining the present application, and are not intended to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value or combined with other lower or upper limits to form a range that is not explicitly specified.

In the description herein, it should be noted that, unless otherwise stated, the recitation of numerical ranges by "no less than" and "no more than" include all numbers within that range including the endpoints. As used herein, "a", "an", "the", "at least one", and "one or more" are used interchangeably, unless indicated otherwise and the recitation of "more" in the phrase "one or more" includes two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Silicon-Oxygen Compound

A first aspect of embodiments of the present application provides a silicon-oxygen compound. The silicon-oxygen compound has a formula of $SiO_x$, in which $0<x<2$, and the silicon-oxygen compound comprises both sulfur element and manganese element, wherein the content of the sulfur element is 20 ppm~600 ppm; and wherein the mass ratio of the sulfur element to the manganese element is from 1.5 to 10.0.

In this context, ppm (parts per million) is the parts per million of the mass of the sulfur element or manganese element relative to the mass of the silicon-oxygen compound.

The silicon-oxygen compound of the present application contains both sulfur element and manganese element. The content of the sulfur element is from 20 ppm to 600 ppm, and the mass ratio of the sulfur element to the manganese element is from 1.5 to 10.0. Although the principle cannot be explained well, according to the research, it can be inferred that the sulfur and manganese element in the above specific range improve the conductivity of active ions and electrons in the process of intercalating/deintercalating active ions (such as lithium ions in lithium-ion secondary batteries) in silicon-oxygen compounds, and can also reduce the polarization of the negative electrode and can suppress the increase of the negative electrode impedance during the cycle; and the lithium-sulfur compound formed by the reaction of sulfur element and lithium ions also acts as a buffer inside the particle, which slows down the expansion and cracking of the particle. It is beneficial to improving the capacity and the capacity retention rate during the cycle process of the silicon oxide compound, thereby greatly improving the initial coulombic efficiency and cycle performance of the secondary battery.

Therefore, the use of the silicon-oxygen compound of the present application enables the secondary battery to simultaneously have higher cycle performance, initial coulombic efficiency and energy density.

Optionally, in the formula $SiO_x$ of the silicon-oxygen compound, $0.6 \leq x \leq 1.5$. For example, $0.9 \leq x \leq 1.2$.

The silicon-oxygen compound satisfies that x is 2 or less, such as 1.5 or less, or 1.2 or less, which enables the silicon-oxygen compound to have higher capacity performance and higher initial coulombic efficiency. The silicon-oxygen compound satisfies that x is greater than 0, such as 0.6 or more, or 0.9 or more, which can better reduce the volume expansion effect of the silicon-oxygen compound, ensuring that the silicon-oxygen compound has high capacity and long cycle life.

In some embodiments, in the silicon-oxygen compound, the content of the sulfur element may be ≤600 ppm, ≤550 ppm, ≤500 ppm, ≤450 ppm, ≤400 ppm, ≤350 ppm, ≤300 ppm, ≤280 ppm, ≤260 ppm, ≤220 ppm, ≤200 ppm, ≤180 ppm, ≤160 ppm, or ≤150 ppm. The content of the sulfur element may be ≥20 ppm, ≥30 ppm, ≥40 ppm, ≥50 ppm, ≥70 ppm, ≥80 ppm, ≥90 ppm, ≥100 ppm, ≥120 ppm, or ≥130 ppm. Optionally, the content of the sulfur element is from 50 ppm to 200 ppm.

The content of the sulfur element may be selected to be 600 ppm or less, for example, 200 ppm or less, which can ensure that the silicon-oxygen compound has a high gram capacity and initial coulombic efficiency. The content of sulfur element may be selected to be 20 ppm or more, for example, 50 ppm or more, so that the silicon-oxygen compound can have a long cycle life.

In the silicon-oxygen compound of the present application, the mass ratio of the sulfur element to the manganese element may be ≤10.0, ≤9.5, ≤9.0, ≤8.5, ≤8.0, ≤7.5, or ≤7.0. The mass ratio of the sulfur element to the manganese element may be ≥1.5, ≥2.0, ≥2.5, ≥3.0, ≥3.5, ≥4.0, ≥4.5, ≥5.0, ≥5.5, or ≥6.0. Optionally, the mass ratio of the sulfur element to the manganese element is from 2.0 to 7.0.

The mass ratio of sulfur element to manganese element within the above-mentioned range further enhances the capacity and cycle life of the silicon-oxygen compound, thereby further improving the capacity performance and cycle performance of the secondary battery. Although the principle cannot be explained well, according to research, it can be inferred that the mass ratio of the sulfur element to manganese element within the above range can better exert the synergistic effect of sulfur element and manganese element, thereby further increasing the capacity and cycle life of silicon-oxygen compound.

In the silicon-oxygen compound of the present application, optionally, the content of the manganese element is from 5 ppm to 300 ppm. For example, the content of the manganese element may be ≤300 ppm, ≤280 ppm, ≤260 ppm, ≤200 ppm, ≤150 ppm, ≤120 ppm, ≤90 ppm, ≤80 ppm, ≤70 ppm, ≤65 ppm, or ≤60 ppm. The content of the manganese element may be ≥5 ppm, ≥10 ppm, ≥12 ppm, ≥15 ppm, ≥20 ppm, ≥25 ppm, ≥30 ppm, ≥35 ppm, ≥40 ppm, ≥45 ppm, ≥50 ppm, or ≥55 ppm. Further optionally, the content of the manganese element is from 10 ppm to 90 ppm.

The content of the manganese element may be 300 ppm or less, which can avoid excessive loss of the gram capacity of the silicon-oxygen compound, so that it is beneficial to making the silicon-oxygen compound have a high gram capacity. The content of the manganese element may be 5 ppm or more, which is beneficial to the electronic conductivity of the silicon-oxygen compound, thereby improving its cycle life.

Figure 1:
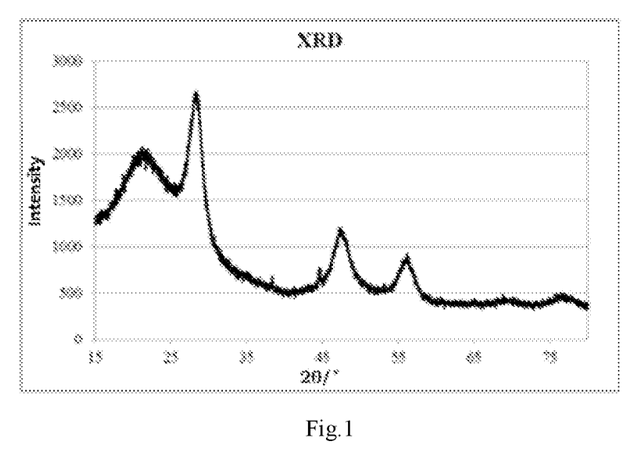
FIG. 1 is an X-ray diffraction (XRD) pattern of a silicon-oxygen compound according to an embodiment of the present application.

In some embodiments, optionally, referring to FIG. 1, in the X-ray diffraction analysis, the silicon-oxygen compound has a first diffraction peak at a position where the diffraction angle 2θ is 26°~30°, and the full width at half maxima of the first diffraction peak is 0.8°~3.2°; the silicon-oxygen compound has a second diffraction peak at the position where the diffraction angle 2θ is 46°~50°, and the full width at half maxima of the second diffraction peak is 1.0°~4.2°; and the silicon-oxygen compound has a third diffraction peak at the position where the diffraction angle 2θ is 54°~58°, and the full width at half maxima of the third diffraction peak is 0.8°-4.5°.

Here, the full width at half maxima (FWHM), which is also called the full width at half maximum, refers to the width of the peak at half the height of the peak.

The silicon-oxygen compound has the above three diffraction peaks and the full width at half maxima is within the given range, indicating that it has better crystallite size and suitable crystallinity, so that the silicon-oxygen compound has higher capacity performance and initial coulombic efficiency, which enables the silicon-oxygen compound material to maintain high structural stability during charge and discharge cycle, and not prone to crack, thereby increasing the cycle life of the battery.

In some embodiments, optionally, the powder volume resistivity of the silicon-oxygen compound under a pressure of 20 MPa is 10 Ω·cm or less, such as 1 Ω·cm or less. The powder volume resistivity of the silicon-oxygen compound within the above range can reduce the barriers to electron migration inside the particles and is beneficial to improving the dynamic performance of the silicon-oxygen compound and to reducing the polarization of the negative electrode, thereby improving the cycle life of the secondary battery. The powder volume resistivity can be adjusted by adjusting the content of the sulfur element and the manganese element, and the surface treatment of the silicon-oxygen compound can be used to further reduce the powder volume resistivity.

In some embodiments, optionally, the outer surface of the silicon-oxygen compound has a coating layer, and the coating layer may comprises one or more of a polymer, a carbon material, a metal material, and a metal compound. For example, the coating layer comprises one or more of a polymer coating layer, a carbon coating layer, and a metal compound coating layer.

Optionally, the polymer may be selected from one or more of polyaniline, polyacetylene, polystyrene, polyacrylonitrile, polyvinyl chloride and polyethylene.

Optionally, the carbon material may comprise one or more of graphite, mesophase carbon microspheres (MCMB), carbon from hydrocarbon pyrolysis, hard carbon, and soft carbon. The graphite may be one or more of natural graphite and artificial graphite.

Optionally, the metal compound may comprise one or more of $Ti_5Si_3$, $Al_2O_3$, and $TiO_2$.

The coating layer can further alleviate the volume expansion effect of the silicon-oxygen compound and can increase the cycle life of the material. At the same time, the coating layer also protects the silicon-oxygen compound, inhibits the side reaction of the electrolyte on the surface of the material, and protects the surface of the material from being corroded by the electrolyte, ensuring that the silicon-oxygen compound has a higher capacity, so that the cycle life of the secondary battery is further improved.

In some embodiments, optionally, the average particle size Dv50 of the silicon-oxygen compound is 2 μm≤Dv50≤15 μm, such as 3 μm.≤Dv50≤12 μm.

The average particle size Dv50 may be selected to be 2 μm or more, such as 3 μm or more, which can reduce the film-forming consumption of active ions on the negative electrode and reduce the side reactions of the electrolyte on the negative electrode, thereby reducing irreversible capacity of the secondary battery and improving the cycle performance of the secondary battery. In addition, the average particle size Dv50 may be selected to be 2 μm or more, such as 3 μm or more, which can also reduce the amount of binder added in the negative electrode plate and is beneficial to increasing the energy density of the secondary battery.

The average particle size Dv50 may be selected to be 15 μm or less, such as 12 μm or less, so that the migration path of active ions and electrons in the material particles is shorter, and that the migration rate of ions and electrons is improved, thereby improving the dynamic performance of the secondary battery. It is also beneficial to preventing the silicon-oxygen compound from cracking during charge and discharge process, thereby improving the cycle performance of the secondary battery.

In some embodiments, optionally, the specific surface area of the silicon-oxygen compound is 1 m$^2$/g~7 m$^2$/g, such as 2 m$^2$/g~6 m$^2$/g.

Optionally, the specific surface area of the silicon-oxygen compound may be 1 m$^2$/g or more, such as 2 m$^2$/g or more, which can make the surface of the silicon-oxygen compound particles have more active sites and can effectively improve the electrochemical performance of the silicon-oxygen compound to meet the requirements of secondary batteries for dynamic performance. Optionally, the specific surface area of the silicon-oxygen compound may be 7 m$^2$/g or less, such as 6 m$^2$/g or less, which is beneficial to reducing the side reaction of the electrolyte on the negative electrode, and can also reduce the film-forming consumption of active ions on the negative electrode, thereby reducing the irreversible capacity of the secondary battery and improving the cycle performance of the secondary battery.

In some embodiments, optionally, the silicon-oxygen compound has a compacted density of 1.2 g/cm$^3$~1.7 g/cm$^3$ as measured under a pressure of 5 tons (equivalent to 49 KN), such as 1.3 g/cm$^3$~1.6 g/cm$^3$. The compacted density within the above range can enable the secondary battery to obtain higher energy density.

In the present application, the content of sulfur element and manganese element in the silicon-oxygen compound of the present application can be determined by instruments and methods known in the art. For example, refer to EPA-3052-1996 "Microwave Assisted Acid Digestion of Silicates" to digest the silicon-oxygen compound, and then use an inductively coupled plasma emission spectrometer (ICP-OES, Type: ICAP-7000) from Thermo Fisher Scientific Company in accordance with EPA 6010D-2014 "Inductively Coupled Plasma Atomic Emission Spectrometry" (Thermo Fisher Scientific) to determine the content of sulfur element and manganese element. The specific test method is as follows: using 10 mL nitric acid and 10 mL hydrofluoric acid to digest 0.5 g of silicon-oxygen compound sample by microwave, adding it to 50 mL volumetric flask after digestion, and then using ICAP-7000 ICP-OES to determine the content of sulfur element and manganese element.

In the present application, the X-ray diffraction spectrum of the silicon-oxygen compound of the present application can be measured by instruments and methods well known in the art. For example, an X-ray powder diffractometer is used to measure the X-ray diffraction spectrum in accordance with JIS K0131-1996 (General rules for X-ray diffractometric analysis). For another example, an X-ray diffractometer (Type: Bruker D8 Discover) from Bruker AxS, Germany is used, wherein CuK$_\alpha$ rays is used as the radiation source, the ray wavelength is λ=1.5406 Å, the scanning 2θ angle range is 10°~90°, and the scanning rate is 4°/min.

In the present application, the powder volume resistivity of the silicon-oxygen compound under a pressure of 20 MPa has a well-known meaning in the art and can be measured by a known test method in the art. As an example, the four-probe method is used to test the powder volume resistivity of the silicon-oxygen of the present application under a pressure of 20 MPa. The test method includes: adding the powder of the silicon-oxygen of the present application to a sample table, and applying a pressure of 20 MPa to the powder through a press, after the pressure is stable, reading the volume resistivity of the silicon-oxygen under the pressure of 20 MPa via a resistivity tester (such as ST2722).

In the present application, the average particle size Dv50 of the silicon-oxygen has a well-known meaning in the art, and can be measured with a well-known instrument and method in the art. For example, refer to GB/T 19077-2016 (Particle Size Distribution-Laser Diffraction Methods), and use a laser particle size analyzer for easy determination, such as the Mastersizer 2000E-typed laser particle size analyzer from Malvern Instruments Co., Ltd., UK.

In the present application, the specific surface area of the silicon-oxygen has a well-known meaning in the art, and it can be measured by instruments and methods known in the art. For example, according to GB/T 19587-2017 (Determination of the specific surface area of solids by gas adsorption using the BET method), analysis of the specific surface area by the nitrogen adsorption can be used, and the specific surface area can be calculated by the BET (Brunauer Emmett Teller) method, in which the analysis of the specific surface area by the nitrogen adsorption can be carried out by a specific surface and pore size distribution analyzer (Type: Tri Star II 3020) from Micromeritics, USA.

In the present application, the compacted density of the silicon-oxygen can be measured with instruments and methods known in the art. For example, with reference to GB/T24533-2009 standard, it can be measured by an electronic pressure testing machine, such as UTM7305 electronic pressure testing machine. Accurately weigh about 1 g of the sample, add it to a mold with a bottom area of 1.327 cm$^2$, apply a pressure of 5 tons (corresponding to 49 KN) to the sample with a pressurizing device and keep it under this pressure for 30 seconds before releasing the pressure, and then measure the height of the sample to pass. The compacted density of the silicon-oxygen compound can be obtained from the following formula: $\rho=m/(1.327*h)$, where $\rho$ represents the compacted density of the silicon-oxygen compound, m represents the mass of the sample, and h represents the height of the sample after being applied with a pressure of 5 tons and held at this pressure for 30 seconds before releasing the pressure.

The present application further provides a method for preparing a silicon-oxygen compound, including the following steps:

S10: providing raw materials, heating the raw materials in an inert atmosphere under normal pressure or reduced pressure to generate gas.

S20: cooling the gas in an inert atmosphere under normal pressure or reduced pressure, and depositing the gas to obtain the silicon-oxygen compound of the first aspect of the present application.

Optionally, the raw materials comprise silicon dioxide powder, sulfur source, and one or more of silicon monoxide powder and metallic silicon powder sulfur source, and optionally added manganese source.

Optionally, the sulfur element may be derived from the sulfur source of the aforementioned raw materials.

Optionally, the manganese element may be derived from silicon monoxide powder and/or metallic silicon powder, and may also be derived from the manganese source in the aforementioned raw materials.

The content of the sulfur element in the silicon-oxygen compound of the present application can be controlled by adjusting the type and amount of sulfur source; and the content of the manganese element in the silicon-oxygen compound of the present application can be controlled by one or more of the following means: by selecting the silicon-oxygen powder or metallic silicon powder with different content of manganese element, by adjusting the types and the amount of the manganese source, so that the content of the sulfur element is from 20 ppm to 600 ppm, and the mass ratio of the sulfur element to the manganese element is from 1.5 to 10.0.

Optionally, the sulfur source may be selected from one or more of high-sulfur coke, elemental sulfur, metal sulfide, sulfate, and polysulfide.

Optionally, the manganese source may be selected from one or more of metallic manganese, manganese alloys, and manganese compounds, wherein the manganese compounds can be selected from one or more of manganese oxide, manganese sulfide, manganese carbonate, manganese hydroxide, manganese acetate, manganese oxalate, manganese nitrate and manganese sulfate In some embodiments, in the above preparation method, in step S10, the inert atmosphere may be a nitrogen atmosphere, an argon atmosphere, a helium atmosphere, or the like. The pressure of the inert atmosphere is normal pressure or reduced pressure, and optionally, the absolute pressure of the inert atmosphere is from 10 Pa to 1 kPa, such as 20 Pa to 50 Pa. The heating temperature can be 1100° C.~1600° C.

Within the above heating temperature range, increasing the temperature can increase the content of sulfur and manganese element in the finally obtained silicon-oxygen compound.

Within the above-mentioned inert atmosphere pressure range, reducing the pressure, i.e., increasing the vacuum degree, can increase the content of sulfur and manganese element in the finally obtained silicon-oxygen compound.

In the above preparation method, in step S20, the inert atmosphere may be a nitrogen atmosphere, an argon atmosphere, a helium atmosphere, or the like. Optionally, the absolute pressure of the inert atmosphere is from 10 Pa to 1 kPa, such as 20 Pa to 50 Pa.

In the above preparation method, in step S20, the silicon-oxygen compound of the present application can obtain an appropriate crystal structure by adjusting the deposition temperature and the like. Optionally, the deposition temperature is 800° C.~1000° C., such as 950° C., which is conducive to obtaining better crystallite size and suitable crystallinity of the silicon-oxygen compound, so that the silicon-oxygen compound has higher initial coulombic efficiency and cycle performance. When the temperature is lower than 800° C., the crystallinity of the material may be too low, affecting the initial coulombic efficiency of the material; when the temperature is higher than 1000° C., the crystallite size of the material may be too large, which affects the cycle performance of the material.

In the above preparation method, after step S20, an optional step S30 is further included to crush the obtained deposits to obtain a silicon-oxygen compound with the above particle size distribution and specific surface area.

In step S30, any method and equipment known in the art can be used to crush the deposit, such as a grinder. For another example, the deposit is ground in a planetary ball mill for a certain period of time to obtain the silicon-oxygen compound of the present application.

In the above preparation method, after step S30, an optional step S40 is further included to surface-coat the particulates obtained in step S30.

In step S40, a chemical vapor deposition method may be used to coat the surface of the particulates to form a coating layer. For example, a gas of hydrocarbon compound is introduced into a reaction furnace containing the particulates, and heat treatment is performed under an inert atmosphere to carbonize the hydrocarbon compound to form a coating layer covering the surface of the particulates to obtain a silicon-oxygen compound with a carbon coating layer on the surface.

A liquid phase coating method can also be used to coat the surface of the particles to form a coating layer. For example, dissolve a polymer in a certain solvent, stir well with the silicon-oxygen particles, mix homogeneously, and then evaporate the solvent to remove it, and then make the polymer evenly coated on the surface of silicon-oxygen particles.

Secondary Battery

The second aspect of embodiments of the present application provides a secondary battery comprising the silicon-oxygen compound according to the first aspect of the present application.

Specifically, the secondary battery comprises a positive electrode plate, a negative electrode plate, a separator, and an electrolyte. The negative electrode comprises a negative current collector and a negative electrode film disposed on at least one surface of the negative current collector and comprising a negative active material, wherein the negative active material comprises the silicon-oxygen compound according to the first aspect of the present application.

In the secondary battery of the present application, the negative electrode current collector can be made of a material with good conductivity and mechanical strength, such as copper foil.

In the secondary battery of the present application, furthermore, the negative active material may comprise one or more of graphite, mesophase carbon microspheres (MCMB), hard carbon, and soft carbon, such as graphite. The graphite can be selected from one or more of artificial graphite and natural graphite.

In the secondary battery of the present application, furthermore, the negative electrode film may optionally comprise a conductive agent, a binder, and a thicker, and there is no specific limitation on their types, and those skilled in the art can make selections according to actual needs.

Optionally, the conductive agent used for the negative electrode film can be one or more of graphite, superconducting carbon, acetylene black, carbon black, Ketjen black, carbon dots, carbon nanotubes, graphene, and carbon nanofibers. The binder can be one or more of polyacrylic acid (PAA), sodium polyacrylate (PAAS), polyvinyl alcohol (PVA), styrene butadiene rubber (SBR), sodium carboxymethyl cellulose (CMC), sodium alginate (SA), polymethacrylic acid (PMAA) and carboxymethyl chitosan (CMCS). The thickener can be sodium carboxymethyl cellulose (CMC-Na).

The negative electrode plate can be prepared according to conventional methods in the art. For example, the negative active material and optional conductive agent, binder and thickener are dispersed in a solvent which can be deionized water to form a uniform negative electrode slurry. The negative electrode slurry is coated on the negative electrode current collector. After being dried, cold pressed and other processes, a negative electrode plate is obtained.

In the secondary battery of the present application, the positive electrode plate comprises a positive electrode current collector and a positive electrode film disposed on at least one surface of the positive electrode current collector and comprising a positive active material.

In the secondary battery of the present application, the positive electrode current collector can be made of materials with good electrical conductivity and mechanical strength, such as aluminum foil.

In the secondary battery of the present application, the type of the positive active material is not specifically limited, and materials capable of reversibly deintercalating active ions can be used, and those skilled in the art can make selections according to actual needs. Optionally, the positive active material may be selected from lithium transition metal oxides and modified materials thereof, and the modified material may be lithium transition metal oxide subjected to doping modification and/or coating modification. Optionally, the lithium transition metal oxide can be selected from one or more of lithium cobalt oxide, lithium nickel oxide, lithium manganese oxide, lithium nickel manganese oxide, lithium nickel cobalt manganese oxide, and lithium nickel cobalt manganese oxide.

In the secondary battery of the present application, the positive electrode film may also comprise a binder and/or a conductive agent. The types of the binder and the conductive agent are not specifically limited, and those skilled in the art can make selections according to actual needs. Optionally, the binder used for the positive electrode film may comprise one or more of polyvinylidene fluoride (PVDF) and polytetrafluoroethylene (PTFE); the conductive agent may comprise one or more of graphite, superconducting carbon, acetylene black, carbon black, Ketjen black, carbon dots, carbon nanotubes, graphene, and carbon nanofibers.

The above-mentioned positive electrode plate can be prepared according to conventional methods in the art. For example, the positive active material and optionally conductive agent and binder are dispersed in a solvent (such as N-methylpyrrolidone, or NMP for short), to form a uniform positive electrode slurry, and the positive electrode slurry is coated on the positive electrode collector. After being dried, cold pressed and other processes, the positive electrode plate is obtained.

In the secondary battery of the present application, there is no specific limitation on the type of electrolyte, and it can be selected according to requirements. The electrolyte may be selected from at least one of solid electrolyte and liquid electrolyte (i.e. an electrolytic solution). When the electrolyte is an electrolytic solution, the electrolytic solution comprises an electrolyte salt and a solvent.

Optionally, the electrolyte salt may be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium difluorooxalatophosphate) and LiTFOP (lithium tetrafluorooxalate phosphate).

Optionally, the solvent may be one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethylsulfone (MSM), methylethylsulfone (EMS), and diethylsulfone (ESE).

The electrolytic solution may optionally comprise an additive. The additive is not particularly limited and can be selected according to requirements. For example, the additives may comprise negative electrode film-forming additives, positive electrode film-forming additives, and additives that can improve certain performance of the battery, such as additives that improve overcharge performance of the battery, additives that improve high-temperature performance of the battery, and those that improve low-temperature performance of the battery.

In the secondary battery of the present application, the separator serves to isolate the positive electrode plate and the negative electrode plate. The separator is not particularly limited, and any well-known porous structure separator having electrochemical stability and chemical stability can be selected, such as one or more of glass fiber, non-woven fabric, polyethylene, polypropylene and polyvinylidene fluoride. The separator can be a single-layer film or a multilayer composite film. When the separator is a multilayer composite film, the materials of each layer may be the same or different.

The secondary battery can be prepared by a method known in the art. As an example, a positive electrode plate, a separator, and a negative electrode plate are wound (or stacked) in order, so that the separator is located between the positive electrode plate and the negative electrode plate to play a role of isolation, as such to obtain a battery core. The battery core is placed in a packaging case, and then an electrolyte is injected and sealed to obtain a secondary battery.

Figure 2:
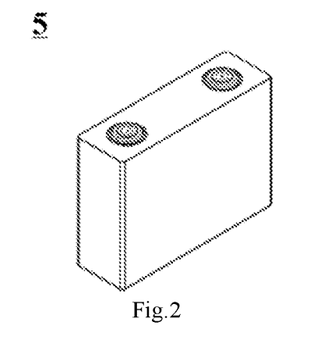
FIG. 2 is a perspective view of an embodiment of a secondary battery.

The present application has no particular limitation on the shape of the secondary battery, which may be cylindrical, square or any other shapes. FIG. 2 shows a secondary battery 5 with a square structure as an example.

In some embodiments, the secondary battery may comprise an outer package. The outer packaging is used to package the positive electrode plate, the negative electrode plate and the electrolyte.

Figure 3:
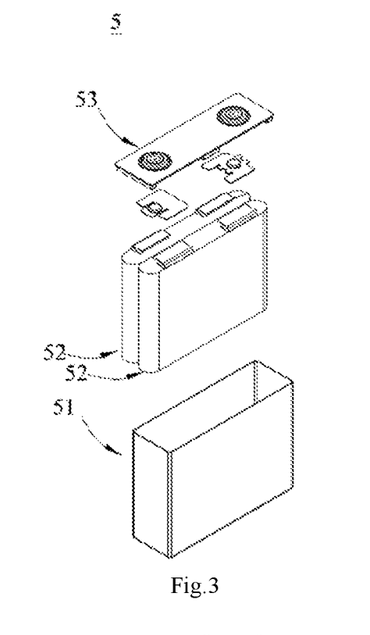
FIG. 3 is an exploded view of FIG. 2.

In some embodiments, referring to FIG. 3, the outer package may comprise a housing 51 and a cover 53, wherein the housing 51 may comprise a bottom plate and a side plate connected to the bottom plate, and the bottom plate and the side plate enclose a receiving cavity. The housing 51 has an opening communicating with the receiving cavity, and the cover plate 53 can cover the opening to close the receiving cavity.

A positive electrode plate, a negative electrode plate and a separator may be formed into an electrode assembly 52 through a winding process or a lamination process. The electrode assembly 52 is packaged in the receiving cavity. The electrolyte which can be an electrolytic solution is infiltrated in the electrode assembly 52. The number of electrode assemblies 52 contained in the battery 5 can be one or more, which can be adjusted according to requirements.

In some embodiments, the outer packaging of the secondary battery may be a hard case, such as a hard plastic case, an aluminum case, a steel case. The outer packaging of the secondary battery may also be a soft bag, such as a pouch type soft bag. The material of the soft bag can be plastic, for example, it can comprise one or more of polypropylene (PP), polybutylene terephthalate (PBT), polybutylene succinate (PBS).

In some embodiments, the secondary battery can be assembled to form a battery module. The number of secondary batteries contained in the battery module can be multiple, and the specific number can be adjusted according to the application and capacity of the battery module.

Figure 4:
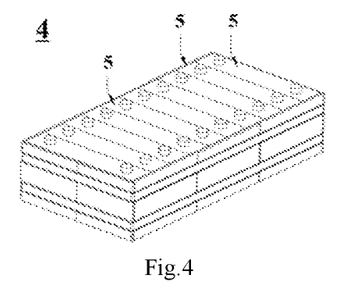
FIG. 4 is a perspective view of an embodiment of a battery module.

FIG. 4 is a battery module 4 as an example. Referring to FIG. 4, in the battery module 4, a plurality of secondary batteries 5 may be arranged in sequence along the length direction of the battery module 4. Of course, it can also be arranged in any other manner. Further, the plurality of secondary batteries 5 can be fixed by fasteners.

Optionally, the battery module 4 may further comprise a housing with a receiving space, and a plurality of secondary batteries 5 are accommodated in the receiving space.

In some embodiments, the above-mentioned battery module can further be assembled into a battery pack. The number of battery modules contained in the battery pack can be adjusted according to the application and capacity of the battery pack.

Figure 5:
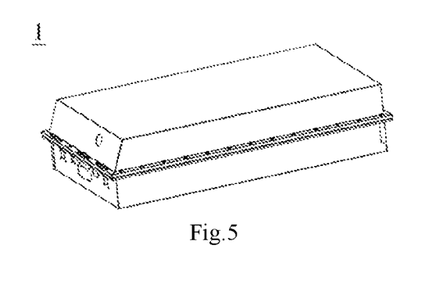
FIG. 5 is a perspective view of an embodiment of a battery pack.
Figure 6:
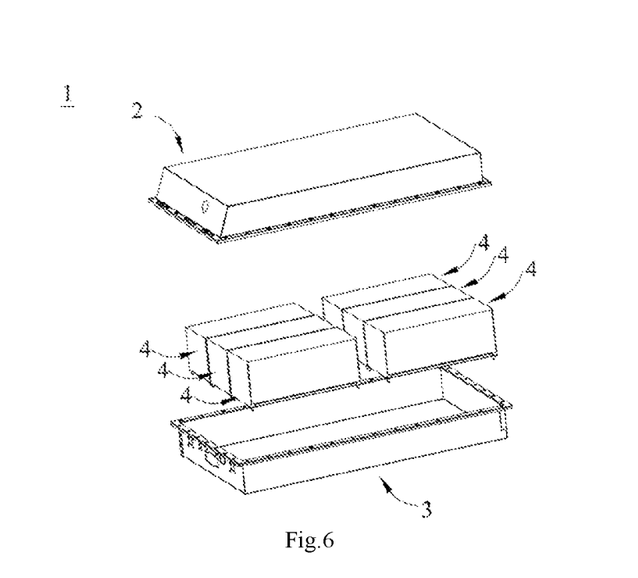
FIG. 6 is an exploded view of FIG. 5.

FIGS. 5 and 6 are the battery pack 1 as an example. Referring to FIGS. 5 and 6, the battery pack 1 may comprise a battery case and a plurality of battery modules 4 provided in the battery case. The battery case includes an upper case 2 and a lower case 3. The upper case 2 can be covered on the lower case 3 and forms a closed space for accommodating the battery module 4. Multiple battery modules 4 can be arranged in the battery box in any manner.

Device

The present application further provides a device comprising at least one of the secondary battery, battery module, or battery pack of the present application. The secondary battery, battery module or battery pack can be used as a power source of the device, and can also be used as an energy storage unit of the device. The device can be, but is not limited to, mobile devices (such as mobile phones, notebook computers), electric vehicles (such as pure electric vehicles, hybrid electric vehicles, plug-in hybrid electric vehicles, electric bicycles, electric scooters, electric golf carts, electric trucks), electric trains, ships and satellites, energy storage systems, etc.

The device can be selected as a secondary battery, a battery module, or a battery pack according to its usage requirements.

Figure 7:
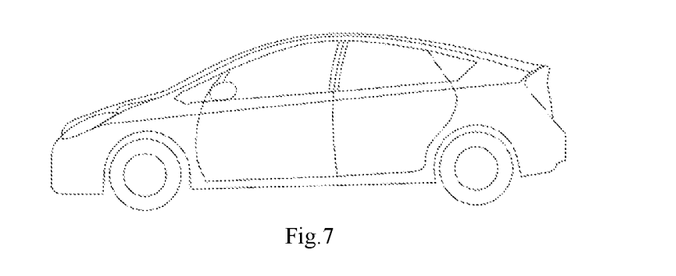
FIG. 7 is a schematic view showing an embodiment of a device using a secondary battery as a powder source.

FIG. 7 is a device as an example. The device is a pure electric vehicle, a hybrid electric vehicle, or a plug-in hybrid electric vehicle. In order to meet the requirements of the device for high power and high energy density of the secondary battery, a battery pack or a battery module can be used.

As another example, the device may be a mobile phone, a tablet computer, a notebook computer, etc. The device is generally required to be thin and light, and a secondary battery can be used as a power source.

EXAMPLE

The following examples are intended to describe the disclosure of the present application, and are intended to be illustrative only, and various modifications and changes in the scope of the present disclosure will be apparent to those skilled in the art. All parts, percentages, and ratios reported in the following examples are by weight unless otherwise stated, and all reagents used in the examples are commercially available or synthetically obtained by conventional methods and are directly used without further processing, and the instruments used in the examples are commercially available.

Example 1

Preparation of Silicon-Oxygen Compound
1) 43.18 g of metallic silicon 1 powder (purified metallic silicon product, content of silicon element ≥99.7%; content of manganese element is 100 ppm; content of aluminum element ≤1000 ppm; content of iron element ≤1000 ppm, content of calcium element ≤100 ppm), 6.82 g of metallic silicon 2 powder (content of silicon element ≥98.5%; content of manganese element is 1000 ppm; content of aluminum element ≤5000 ppm; content of iron element ≤5000 ppm; content of calcium element ≤3000 ppm), 50 g of silicon dioxide powder and 1.21 g of high-sulfur coke powder containing 2.5 wt % of sulfur were mixed to obtain the mixture of the raw materials, wherein the content of the sulfur element was 299 ppm, and the content of the manganese element was 110 ppm. In the raw materials, the sulfur element was derived from high-sulfur coke; the manganese element was derived from metallic silicon 1 and metallic silicon 2, and no manganese source was added.

2) The raw materials were heated at a temperature of 1300° C. in a helium atmosphere with an absolute pressure of 30 Pa to generate $SiO_x$ gas containing 30 ppm of sulfur element and 20 ppm of manganese element.

3) In a helium atmosphere with an absolute pressure of 30 Pa, the gas was cooled at a temperature of 950° C. to deposit the gas, and the deposit was crushed to obtain a silicon-oxygen compound of the present application.

Preparation of Negative Electrode Plate

The resulting silicon-oxygen compound, a conductive agent Super-P (conductive carbon black), and a binder PAA (polyacrylic acid) were mixed at a mass ratio of 85:5:10 in an appropriate amount of deionized water to obtain a homogeneous negative electrode slurry; the negative electrode slurry was coated on the surface of the negative electrode current collector copper foil, dried and cold pressed to obtain a negative electrode plate.

Counter electrode: metal lithium sheet.

Separator: polyethylene (PE) film.

Preparation of electrolyte: ethylene carbonate (EC), ethyl methyl carbonate (EMC), and diethyl carbonate (DEC) were mixed in a volume ratio of 1:1:1, and $LiPF_6$ was uniformly dissolved in the mixture of the solvent to obtain an electrolytic solution, and then fluoroethylene carbonate (FEC) was added, wherein the concentration of $LiPF_6$ was 1 mol/L, and the mass percentage of FEC in the electrolyte was 6%.

Preparation of Button Battery

The above-mentioned negative electrode plate, separator, metal lithium piece and counter electrode were laminated in order, and the above-mentioned electrolyte was added to obtain a button battery.

Examples 2 to 22 and Comparative Examples 1 to 4

Different from Example 1, the relevant parameters in the preparation process of the silicon-oxygen compound were adjusted to obtain the corresponding silicon-oxygen compound. See Table 1 and Table 2 for details. In Table 2, S/Mn represents the mass ratio of sulfur element to manganese element in the silicon-oxygen compound.

Test for Capacity Performance and Cycle Performance of Button Battery

Under a normal pressure environment at 25° C. a button battery was discharged at a constant current rate of 0.1 C to 0.005V, and then discharged at a constant current of 0.04 C to 0.005V, and then was left for 5 minutes. The resulting discharge capacity was recorded as the lithiation capacity after the first cycle. After that, the battery was charged to 1.5V at a constant current rate of 0.1 C, and then was allowed to stand for 5 minutes. This was a cyclic charge and discharge cycle. The resulting charge capacity was recorded as the delithiation capacity after the first cycle. The button battery was subjected to 30 cycles of charge-discharge test following the procedure described above, and the delithiation capacity for each cycle was recorded.

The initial coulombic efficiency of button battery (%)=delithiation capacity after the first cycle/the lithiation capacity after the first cycler 100%

Cycle capacity retention rate of button battery (%)=delithiation capacity after the $30^{th}$ cycle/the lithiation capacity after the 30th cycle×100%

The test results of Examples 1 to 22 and Comparative Examples 1 to 4 were shown in Table 2.

TABLE 1

| No. | Metallic silicon 1 (g) | Metallic silicon 2 (g) | Silicon dioxide (g) | Sulfur source Type | Amount (g) | Manganese source Type | Amount (g) | Content of S ppm | Content of Mn ppm |
|---|---|---|---|---|---|---|---|---|---|
| Example 1 | 43.18 | 6.82 | 50.00 | high-sulfur coke | 1.21 | / | / | 299 | 110 |
| Example 2 | 49.40 | 0.60 | 50.00 | high-sulfur coke | 0.81 | / | / | 201 | 55 |
| Example 3 | 36.77 | 13.23 | 50.00 | high-sulfur coke | 2.46 | / | / | 600 | 165 |
| Example 4 | 17.04 | 32.96 | 50.00 | high-sulfur coke | 5.04 | / | / | 1200 | 330 |
| Example 5 | 0.00 | 50.00 | 50.00 | high-sulfur coke | 7.25 | / | / | 1690 | 466 |
| Example 6 | 0.00 | 50.00 | 50.00 | high-sulfur coke | 13.64 | Metallic manganese | 0.046 | 2999 | 844 |
| Example 7 | 0.00 | 50.00 | 50.00 | high-sulfur coke | 21.95 | Metallic manganese | 0.104 | 4496 | 1262 |
| Example 8 | 0.00 | 50.00 | 50.00 | high-sulfur coke | 31.64 | Metallic manganese | 0.161 | 6001 | 1601 |
| Example 9 | 38.72 | 11.28 | 50.00 | high-sulfur coke | 3.31 | / | / | 801 | 147 |
| Example 10 | 39.64 | 10.36 | 50.00 | high-sulfur coke | 4.17 | / | / | 1001 | 138 |
| Example 11 | 40.15 | 9.85 | 50.00 | high-sulfur coke | 5.04 | / | / | 1200 | 132 |
| Example 12 | 38.14 | 11.86 | 50.00 | high-sulfur coke | 6.84 | / | / | 1601 | 147 |
| Example 13 | 38.62 | 11.38 | 50.00 | high-sulfur coke | 7.76 | / | / | 1800 | 141 |

TABLE 1-continued

| | Raw materials and amounts | | | | | | | Content after mixing | |
|---|---|---|---|---|---|---|---|---|---|
| | Metallic silicon 1 | Metallic silicon 2 | Silicon dioxide | Sulfur source | | Manganese source | | Content of S | Content of Mn |
| No. | (g) | (g) | (g) | Type | Amount (g) | Type | Amount (g) | ppm | ppm |
| Example 14 | 38.95 | 11.05 | 50.00 | high-sulfur coke | 8.70 | / | / | 2001 | 137 |
| Example 15 | 36.69 | 13.31 | 50.00 | high-sulfur coke | 11.11 | / | / | 2500 | 153 |
| Example 16 | 34.72 | 15.28 | 50.00 | high-sulfur coke | 13.64 | / | / | 3001 | 165 |
| Example 17 | 39.64 | 10.36 | 50.00 | high-sulfur coke | 4.17 | / | / | 1001 | 138 |
| Example 18 | 39.64 | 10.36 | 50.00 | high-sulfur coke | 4.17 | / | / | 1001 | 138 |
| Example 19 | 39.64 | 10.36 | 50.00 | high-sulfur coke | 4.17 | / | / | 1001 | 138 |
| Example 20 | 39.64 | 10.36 | 50.00 | high-sulfur coke | 4.17 | / | / | 1001 | 138 |
| Example 21 | 39.64 | 10.36 | 50.00 | high-sulfur coke | 4.17 | / | / | 1001 | 138 |
| Example 22 | 40.25 | 9.75 | 50.00 | Sulfur powder | 0.30 | / | / | 2991 | 137 |
| Comparative Example 1 | 0.00 | 50.00 | 50.00 | high-sulfur coke | 35.90 | Metallic manganese | 0.070 | 6601 | 883 |
| Comparative Example 2 | 49.41 | 0.59 | 50.00 | high-sulfur coke | 0.60 | / | / | 149 | 55 |
| Comparative Example 3 | 24.38 | 25.62 | 50.00 | high-sulfur coke | 2.04 | / | / | 500 | 275 |
| Comparative Example 4 | 38.04 | 11.96 | 50.00 | high-sulfur coke | 12.61 | / | / | 2799 | 140 |

In Table 1, "/" indicates that the substance is not added.

TABLE 2

| | Silicon-oxygen compound | | | | Initial coulombic efficiency | capacity retention rate |
|---|---|---|---|---|---|---|
| No | Content of S (ppm) | Content of Mn (ppm) | S/Mn | $D_v50$ (μm) | (%) | (%) |
| Example 1 | 30 | 20 | 1.5 | 6 | 73.1 | 88.1 |
| Example 2 | 20 | 10 | 2.0 | 6 | 77.7 | 92.6 |
| Example 3 | 62 | 30 | 2.1 | 6 | 77.9 | 94.0 |
| Example 4 | 120 | 60 | 2.0 | 6 | 78.0 | 93.7 |
| Example 5 | 186 | 90 | 2.1 | 6 | 77.3 | 93.6 |
| Example 6 | 300 | 148 | 2.0 | 6 | 73.3 | 90.0 |
| Example 7 | 450 | 221 | 2.0 | 6 | 72.5 | 89.5 |
| Example 8 | 600 | 300 | 2.0 | 6 | 71.7 | 88.9 |
| Example 9 | 80 | 27 | 3.0 | 6 | 78.3 | 93.8 |
| Example 10 | 101 | 25 | 4.0 | 6 | 78.3 | 94.5 |
| Example 11 | 120 | 24 | 5.0 | 6 | 77.9 | 93.5 |
| Example 12 | 157 | 27 | 5.8 | 6 | 77.6 | 93.9 |
| Example 13 | 181 | 26 | 7.0 | 6 | 77.3 | 93.5 |
| Example 14 | 194 | 24 | 8.1 | 6 | 72.9 | 87.9 |
| Example 15 | 251 | 28 | 9.0 | 6 | 73.7 | 86.5 |
| Example 16 | 300 | 30 | 10.0 | 6 | 72.9 | 87.5 |
| Example 17 | 101 | 25 | 4.0 | 2 | 71.0 | 87.4 |
| Example 18 | 101 | 25 | 4.0 | 3 | 75.5 | 90.0 |
| Example 19 | 101 | 25 | 4.0 | 8 | 76.2 | 92.7 |
| Example 20 | 101 | 25 | 4.0 | 12 | 75.8 | 90.3 |
| Example 21 | 101 | 25 | 4.0 | 15 | 74.7 | 88.4 |
| Example 22 | 100 | 25 | 4.0 | 6 | 78.3 | 94.2 |
| Comparative Example 1 | 658 | 165 | 4.0 | 6 | 64.2 | 76.6 |
| Comparative Example 2 | 15 | 10 | 1.5 | 6 | 66.4 | 71.5 |
| Comparative Example 3 | 52 | 52 | 1.0 | 6 | 62.9 | 67.4 |
| Comparative Example 4 | 280 | 25 | 11.2 | 6 | 60.3 | 73.4 |

It can be seen from the data in Table 2 that Examples 1-22 all satisfied that the silicon-oxygen compound contained both sulfur element and manganese element, wherein the content of the sulfur content was 20 ppm~600 ppm, and the mass ratio of the sulfur element to the manganese element was 1.5~10.0. The initial coulombic efficiency and cycle capacity retention rate had been significantly improved.

The content of the sulfur element in Comparative Example 1 was too high, which would consume more active lithium ions in the battery (sulfur element reacted with lithium ions to form lithium-sulfur compounds). Therefore, compared with the Examples, the battery's initial efficiency and cycle performance had dropped significantly. The sulfur content of Comparative Example 2 was too low, sulfur and/or its reaction products cannot form an effective buffer inside the particles, so that the particles were more likely to crack during charge and discharge, resulting in that the initial coulombic efficiency and cycle performance the button battery was poor.

The mass ratio of the sulfur element to the manganese element in Comparative Example 3 and Comparative Example 4 was too low or too high, and the sulfur element and manganese element cannot achieve a good synergistic effect, resulting in poor initial efficiency and cycle performance of the material.

The above mentioned descriptions only show particular implementations of the present application and but are not intended to limit the protection scope of the present application. Any modification or replacement readily figured out by a person skilled in the art within the technical scope disclosed in the present application shall fall within the protection scope of the present application. Therefore, the protection scope of the present application shall be determined by the protection scope of the claims.

What is claimed is:

1. A silicon-oxygen composite having a chemical formula of SiOx, in which 0<x<2;
    sulfur element having a content of 20 ppm-600 ppm; and
    manganese element having a content from 5 ppm to 300 ppm,
    wherein a mass ratio of the sulfur element to the manganese element is from 1.5 to 10.0,
    wherein an X-ray diffraction pattern of the silicon-oxygen composite has:
        a first diffraction peak at a position where the diffraction angle 2θ is 26°-30°, wherein the full width at half maxima of the first diffraction peak is 0.8°-3.2°;
        a second diffraction peak at a position where the diffraction angle 2θ is 46°-50°, wherein the full width at half maxima of the second diffraction peak is 1.0°-4.2°; and
        a third diffraction peak at a position where the diffraction angle 2θ is 54°-58°, wherein the full width at half maxima of the third diffraction peak is 0.8°-4.5°
    wherein a content of the manganese element is from 5 ppm to 300 ppm.

2. The silicon-oxygen composite according to claim 1, wherein the content of the sulfur element is from 50 ppm to 200 ppm.

3. The silicon-oxygen composite according to claim 1, wherein the mass ratio of the sulfur element to the manganese element is from 2.0 to 7.0.

4. The silicon-oxygen composite according to claim 1, wherein the silicon-oxygen composite has a powder volume resistivity under a pressure of 20 MPa of 10 Ω·cm or less.

5. The silicon-oxygen composite according to claim 1, wherein the silicon-oxygen composite has an average particle diameter Dv50 of 2 μm-15 μm.

6. The silicon-oxygen composite according to claim 1, wherein the silicon-oxygen composite has a specific surface area from 1 m²/g to 7 m²/g.

7. The silicon-oxygen composite according to claim 1, wherein the silicon-oxygen composite has a compacted density measured under a pressure of 5 tons (equivalent to 49KN) of 1.2 g/cm³-1.7 g/cm³.

8. The silicon-oxygen composite according to claim 1, wherein a coating layer is coated on an outer surface of the silicon-oxygen composite, and the coating layer comprises one or more of a polymer, a carbon material, a metal material, and a metal compound.

9. A secondary battery, including the silicon-oxygen composite to claim 1.

10. The silicon-oxygen composite according to claim 1, wherein a content of the manganese element is from 10 ppm to 90 ppm.

11. The silicon-oxygen composite according to claim 1, wherein the silicon-oxygen composite has a powder volume resistivity under a pressure of 20 MPa of 1 Ω·cm or less.

12. The silicon-oxygen composite according to claim 1, wherein the silicon-oxygen composite has an average particle diameter Dv50 of 3 μm-12 μm.

13. The silicon-oxygen composite according to claim 1, wherein the silicon-oxygen composite has a specific surface area from 2 m²/g to 6 m²/g.

14. The silicon-oxygen composite according to claim 1, wherein the silicon-oxygen composite has a compacted density measured under a pressure of 5 tons (equivalent to 49KN) of 1.3 g/cm³-1.6 g/cm³.

15. A method for preparing the silicon-oxygen composite according to claim 1, characterized in that, the method including includes the following steps:
    providing raw materials comprising silicon dioxide powder, sulfur source, one or more of silicon oxide powder and metal silicon powder, and optionally manganese source; heating the raw material in an inert atmosphere under normal pressure or reduced pressure to generate gas; and
    cooling the gas in an inert atmosphere under normal pressure or reduced pressure to deposit the gas to obtain the silicon-oxygen composite.

16. The method according to claim 15, wherein the temperature of the deposition is from 800° C. to 1000° C.

17. The method according to claim 15, further comprising: a step of crushing the obtained deposit after gas deposition; and a step of surface coating particulate matter after the obtained deposit is crushed.

* * * * *